United States Patent [19]

Muoio

[11] 3,965,518

[45] June 29, 1976

[54] IMPREGNATED WIPER

[75] Inventor: Erland L. Muoio, Racine, Wis.

[73] Assignee: S. C. Johnson & Son, Inc., Racine, Wis.

[22] Filed: July 8, 1974

[21] Appl. No.: 486,285

[52] U.S. Cl. .......................... 15/104.93; 428/153; 428/198; 428/447; 428/537; 106/11
[51] Int. Cl.² .................................. B32B 29/06
[58] Field of Search .......... 427/270, 275, 285, 286, 427/288; 117/44, 11; 15/104.93, 104.94, 209 R; 106/3, 11; 428/198, 153, 447, 284, 289

[56] References Cited
UNITED STATES PATENTS

| | | | |
|---|---|---|---|
| 2,495,066 | 1/1950 | Jones | 15/104.93 |
| 2,523,281 | 9/1950 | Currie | 106/3 |
| 2,584,413 | 2/1952 | Baer et al. | 106/11 |
| 2,856,298 | 10/1958 | Watson | 106/11 |
| 3,088,158 | 5/1963 | Boyle et al. | 15/104.93 |
| 3,448,478 | 6/1969 | Nash et al. | 15/104.93 |
| 3,477,084 | 11/1969 | Thomas | 15/104.93 |
| 3,818,533 | 6/1974 | Scheuer | 15/104.93 |

FOREIGN PATENTS OR APPLICATIONS

| | | | |
|---|---|---|---|
| 746,973 | 11/1966 | Canada | 106/3 |
| 1,294,794 | 1972 | United Kingdom | 117/11 |

Primary Examiner—Ronald H. Smith
Assistant Examiner—Evan K. Lawrence

[57] ABSTRACT

A disposable impregnated wiper for treatment of household surfaces such as furniture. The wiper comprises a cellulosic substrate having a bonding material impregnated into at least one surface in a fine pattern to form bonded web portions of greater strength than the adjacent portions, such substrate being substantially compressible, and an oil-in-water emulsion impregnant having an internal phase of mineral oil and silicone fluid in specified amounts and ratios. The impregnant composition and substrate are in specified ratios and the substrate is loaded to no more than about 50% of its liquid capacity.

21 Claims, 4 Drawing Figures

IMPREGNATED WIPER

FIELD OF THE INVENTION

This invention relates to treatment of household surfaces such as furniture. More specifically, this invention relates to impregnated disposable wipers for treatment of such household surfaces.

DESCRIPTION OF THE PRIOR ART

It has heretofore been generally known to employ various compositions for the cleaning and polishing of hard household surfaces such as furniture. Such compositions have been prepared and used in various forms, including pastes, solutions, lotions, creams and emulsions. One of the most popular and convenient forms in recent years has been an emulsion sprayed from a self-pressurized container.

Certain compositions for treatment of furniture and household surfaces have also been impregnated into substrates of various types. Various examples of such products are shown in the following U.S. Pat. Nos. 2,495,066; 3,619,280; 3,200,036; 1,852,114; and 3,619,251. The prior art includes numerous dusting aids and the like. However, the aforementioned and similar impregnated substrate products have not provided an adequate alternative to the well-known and popular self-pressurized emulsion products. The impregnated substrate products of the prior art have not exhibited good application ability, as is required, for example, to apply a furniture polish composition evenly over a large surface area and leave an even protective film as in the case of the popular pressurized emulsion. Further, some attempts to produce an acceptable impregnated wiper have failed because of poor quality of substrate for the intended use. Many substrate/composition combinations exhibit poor application characteristics. Coverage is uneven. The period of use is inadequate. Also, the substates are often weakened to the point that they fragment during wiping.

Various compositions could be impregnated into a substrate for purposes of polishing household surfaces. Mineral oil has been used in impregnated wipers of various kinds. As mentioned, such products are used primarily as dusting aids, rather than for deposition of a significant film. If substantial amounts of mineral oil were used, a continuous film would be formed, but a separate dry cloth would be necessary because of the extreme oiliness and messiness which would result. Silicone fluids, on the other hand, could not be deposited to form a continuous film. A substrate/composition combination which can deposit a dry, even significant protective film has not heretofore been available.

SUMMARY OF THE INVENTION

The impregnated wiper of this invention exhibits excellent ability to evenly apply a protective film over a large surface area of furniture (for example). This invention provides a convenient disposable product for the care of household surfaces, and is a workable alternative to pressurized emulsion products such as those used for furniture care. By "household surfaces," reference is made to furniture, woodwork, cabinets, kitchen surfaces such as appliances, counters, tiles, vinyl surfaces, marble, and the like.

The impregnated wiper of this invention functions both as the source of the polishing liquid and as the polishing cloth. Therefore, the wiper may be described as "self-polishing".

The disposable wiper of this invention exhibits a unique "metering out" of its impregnant during wiping over household surfaces. The unique metering of the impregnant of this invention enables the aforementioned even application over a large area during a significant period of application. Another advantage of the impregnated wiper of this invention is long shelf life, made possible since little or no volatile solvent is used.

The disposable wiper of this invention has a cellulosic fibrous web substrate having a basis weight of at least about 40 g./m.$^2$, with a bonding material penetrated into at least one surface in a fine pattern to form bonded web portions of greater strength than adjacent portions which do not contain the bonding material. The substrate is made substantially compressible, soft and bulky, preferably by creping. The substrate has a liquid capacity of at least about 200%, and normally about 600%, by weight of substrate. The substrate is impregnated with a particular composition to no more than about 50% of its liquid capacity, and in a weight range ratio to substrate of about 1:1–3:1. The composition is an oil-in-water emulsion having about 4–65% by weight of mineral oil, silicone fluid, having viscosity of about 50–5,000 centistokes, in weight ratio to mineral oil of about 1:12–2.5:1, an emulsifier and water. The total internal phase of the emulsion is about 4–70% by weight of the composition.

If the basis weight is below about 40 g./m.$^2$, the impregnated wiper will not normally meter out the impregnant properly unless the wiper is at least doubled over during use. A substrate of higher basis weight will meter out the impregnant quite well, even using a single layer during the wiping procedure. Although there would appear to be an upper limit on the basis weight of currently available substrates, there is no known upper limit in terms of the performance of impregnated wipers made with the substrate herein described. The substrate used in this invention will be described in greater detail later in this specification.

The impregnated wiper of this invention deposits a dry, even, significant film on household surfaces, without the necessity of using a dry cloth in addition to the impregnated wiper. Such film is shiny, has good clarity and greatly enhances the appearance of surfaces thereby polished. The performance of this invention is quite unexpected. In particular, the dryness, evenness and continuity of the film, particularly its dryness even though in some embodiments large amounts of mineral oil are employed, are particularly surprising. It is believed that this result is made possible by the combination of mineral oil and silicone fluid which is employed, but, in view of the widely varying amounts of mineral oil used, the good dryness is unexpected.

The composition impregnated into the aforementioned substrate to form the disposable wiper of this invention is an oil-in-water emulsion. The amount of internal phase of the emulsion may vary greatly as indicated above. However, if the internal phase is above the upper limit previously specified, the emulsion will normally tend to become unstable. If it is below the lower limit specified, the impregnated wiper will not provide a noticeable polishing effect on household surfaces. The total internal phase should be within the range of about 10–30% by weight of the composition to provide significantly improved performance.

Over about 30% the impregnated wiper deposits a film which is often more oily than normally desirable. Below about 10% the mileage, that is, the amount of area which may be covered, is less than highly desirable. The most effective range for amount of total internal phase, in terms of the polishing performance of an impregnated wiper, is about 18–24% by weight of the composition.

When the total internal phase is in the preferred range of about 10–30%, the amount of mineral oil is preferably about 8–25% by weight of the total composition. Over about 25% the composition will become somewhat oily or greasy and performance characteristics are therefore somewhat impaired. Under about 8% the covering characteristics of the impregnated wiper are somewhat impaired. When the total internal phase is in the most preferred range of 18–24% by weight of the composition, it is preferred that the amount of mineral oil be about 15–20% by weight of the total composition, to obtain the best performance.

The amount of silicone fluid used is within a weight ratio range to mineral oil of 1:12–2.5:1. A preferred weight ratio range of silicone fluid to mineral oil is 1:6–1:1. Within this range, the internal phase of the emulsion will provide a very surprisingly dry film when applied to household surfaces such as furniture, in spite of the high amounts of mineral oil used in some cases.

To provide the unique metering effect of the impregnated wiper of this invention, it is essential that the substrate be loaded to no more than about 50% of its liquid capacity, that is, its capacity for the impregnant used therewith. Excessive loading will cause bleed-out and will give improper metering such that certain areas of a household surface will be covered in a sloppy fashion, and only when the impregnant is exhausted from the substrate to a certain extent will the superior metering performance start to be seen. The substrate used in this invention typically has a liquid capacity of about 600% by weight of substrate. In such cases, for example, the superior metering properties of this invention will be lost if the ratio of impregnant to substrate exceeds about 3:1.

The weight ratio of impregnant to substrate should be within a range of about 1:1–3:1. Below about 1:1, adequate coverage of the surface to be polished is very difficult and the metering qualities of this invention are not evident. A preferred range of weight ratio of impregnant to substrate is about 1.5:1–2.5:1. In this range the performance, particularly the metering mentioned above, is very satisfactory. The most preferred range is about 1.8:1–2.3:1, in which the metering performance will be markedly superior.

OBJECT OF THE INVENTION

One object of this invention is to provide a convenient alternative to the pressurized emulsion product for furniture polish and the like.

Another object of this invention is to provide an impregnated wiper having the ability to deposit a polish such as a furniture polish in an even, dry film over a large area.

Another object of this invention is to provide an impregnated wiper of the class described which is capable of depositing a film over a large area of household surfaces such as furniture.

Yet another object of this invention is to provide an impregnated wiper which has good strength during usage.

Still another object of this invention is to provide an impregnated wiper which has long shelf life and good mileage during use.

Another object of this invention is to provide an impregnated wiper which has a unique metering ability for releasing an impregnated composition which is useful for polishing household surfaces such as furniture.

These and other objects of the invention will become apparent from the following description, including the drawings wherein.

Figure 1:
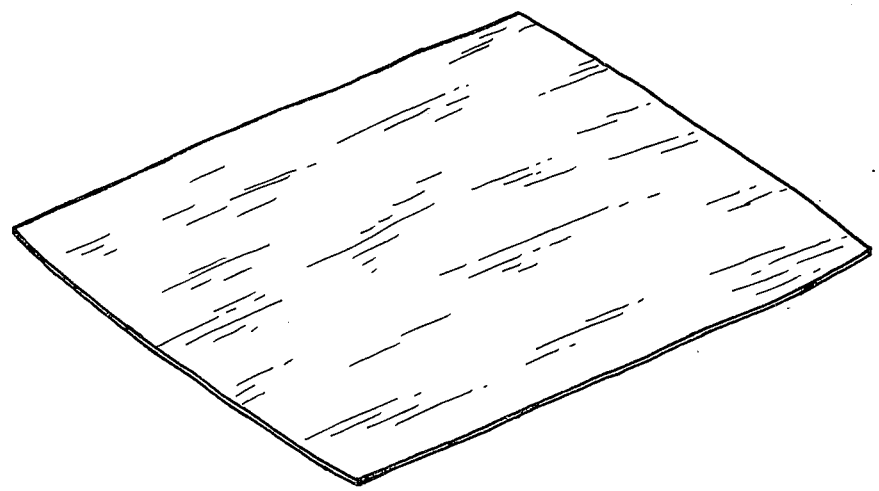
FIG. 1 is a perspective view of an impregnated wiper according to this invention.

The substrate material used in this invention is a nonwoven cellulosic paper material which differs from other nonwovens. This type of substrate is believed to be currently available only from Scott Paper Company of Philadelphia, Pa. It is referred to as High Loft Brand 3000-J Series Paper. It is believed to be made by a unique process and to have unique properties. This substrate is generally described in British Pat. No. 1,294,794, assigned to Scott Paper Company, Philadelphia, Pa, and in one or more presently pending U.S. patent applications.

In the past, there has been extensive activity in the field of papermaking to discover ways of imparting softness to paper webs without degrading their strength. Paper webs are conventionally softened by working them in different ways, such as by creping them from a drying surface with a creping blade. Such a process disrupts and breaks many of the interfiber bonds in the paper web which are formed during the drying thereof by the hydrogen bonding process associated with papermaking. However, these interfiber bonds are the principal source of strength in an ordinary paper web. Very little strength results from the physical entanglement of the fibers since papermaking fibers have such an extremely short length, generally of the order of 1/16 inch or less.

Attempts to improve this situation have involved the creping of webs in only selected spaced-apart areas over its surface, such as by creping with a notched or serrated creping blade, or creping from a discontinuous surface such as a circumferentially grooved roll, leaving the portions therebetween with substantially all of their strength. However, such creping patterns necessarily created lines of weakness through the sheet so that the ultimate sheet was not very strong at least in certain directions.

One of the characteristics of a sheet product which gives the semblance of strength is the toughness of the sheet. In essence, this is representative of a combination of the tensile strength of the sheet and the ability of the sheet to stretch. Obviously, if the sheet can absorb some work imposed upon it by stretching so as to avoid firmly resisting the full force applied, the resulting web appears subjectively to be stronger. It has long been known to crepe webs in various ways to create stretch and, accordingly, to impart toughness. However, even webs which have been creped in one direction, or in several different directions so as to impart universal or isotropic stretch, are weakened by the creping, and accordingly, do not have as much strength as desirable.

In the field of nonwoven webs which generally include substantial amounts of fibers having a length greater than ¼ inch, it has been common practice to apply bonding material to spaced portions of the web so that fibers in at least portions and perhaps in a network across the web become bonded together to impart strength to the web. However, the fibers in such nonwoven webs are sufficiently long to enable small amounts of adhesive to impart substantial strength to the web since any two adjacent areas of adhesive application can be quite far apart and yet be able to bond one fiber into a network.

It has often been thought that to apply bonding material to a paper web (as distinct from the typical nonwoven webs) to impart strength thereto would result in harsh areas in the sheet which would destroy any feeling of softness which is desirable. In addition, in view of the extremely short length of papermaking fibers, it has been felt that the amount of bonding material and the large percentage of the overall area of the sheet which would have to be impregnated to impart any strength to the sheet would result in a very hard sheet, having little or no stretch and poor softness characteristics.

The substrate used in the impregnated wiper of this invention, however, is made by an apparently unique method believed to have been developed by Scott Paper Company. The method involves applying a bonding material to a paper web to impart strength thereto without impairing the softness thereof and, furthermore, increasing the bulk of such a web to give it substantial compressibility and imparting stretchability in all directions in the plane of the web. This method enables softer and bulkier webs to be formed and utilized than was heretofore possible in view of the addition of substantial strength to the web by the bonding material.

The formation of such webs is initiated in a fairly conventional manner on a papermaking machine, except that steps must be taken to weaken the interfiber bonding. This may be done by chemical means such as treating the fibers with a chemical debonder to reduce the interfiber bonding capacity thereof, or by mechanical means such as by 1) using conditions of reduced pressing during web formation to reduce the amount of interfiber bonding in the web, 2) creping the web to weaken interfiber bonding, 3) needling or 4) embossing. Some of these debonding measures are taken during web formation while others are taken after web formation. Other methods may also be employed. In each case, the resulting webs are characterized by very little interfiber bonding strength, and by increased bulk and compressibility.

After such interfiber strength is reduced, this weakness is overcome by application, to at least one side of the web, of a bonding material thereto in a fine pattern. "Fine pattern" refers to a repeating unit size of no more than about ¼ inch in any direction, and normally much smaller. Thereafter, the web may be, and preferably is, creped, thereby softening the surface to remove the harshness normally experienced due to bonded web portions. Such creping also substantially increases the bulk and compressibility of the web, which is most helpful in the holding of the composition used in this invention, and in the unique metering of the composition used. In addition, such creping shortens only such bonded portions of the web in a manner causing buckling or puffing of unbonded areas of the web so that stretch in all directions in the plane of the web is achieved.

The substrate used in this invention is a fibrous sheet material having stretch in all directions in its own plane. The substrate has a basis weight of at least about 40 g./m.$^2$, and preferably at least about 80 g./m.$^2$. The substrate is a cellulosic material which, with interfiber bonding strength being reduced (such as by initial creping), a bonding material is applied to at least one surface and preferably both surfaces in a fine pattern to form bonded web portions of greater strength than adjacent portions not containing the bonding material. The substrate used in this invention also is characterized by substantial compressibility which has been imparted to the web. "Substantial compressibility" means that degree of compressibility typically imparted by mechanical and/or chemical means, such as by creping, needling, chemical debonding and the like. It is highly preferred to utilize a web of the type described which was creped after the aforementioned fine pattern of debonding material has been applied, to give excellent softness and bulk. The substrates used in this invention will typically have a liquid capacity of about 600% by weight, dependent on many factors. The substrate should have a liquid capacity of at least about 200% by weight.

Preferably, the web to which the bonding material is applied is comprised entirely of relatively short fibers, that is, those having a length of less than ¼ inch and predominantly shorter, such as cellulosic fibers like wood pulp or cotton linters used in papermaking. However, relatively high percentages of longer fibers may be utilized without losing the advantages of the present invention, and up to 50% by weight of the fibers may have a length of up to 2½ inches and may comprise any of the natural textile length fibers, such as cotton or wool, or the synthetic textile length fibers such as regenerated cellulose, rayon, cellulose ester fibers such as cellulose acetate fibers, polyamide fibers, acrylonitrile fibers, polyester fibers, vinyl fibers, protein fibers, fluorocarbon fibers, dinitrile fibers, nitrile fibers, and others. It is, of course, essential that the fibers used in the substrate be compatible with the composition impregnated therein.

Figure 3:
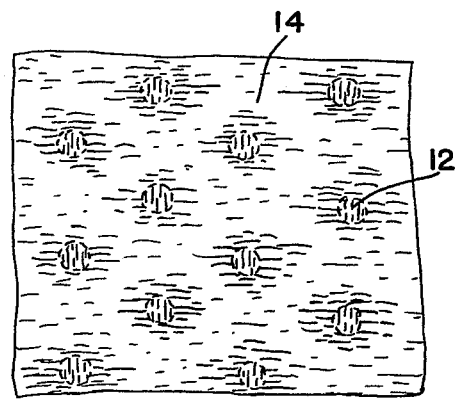
FIGS. 3 and 4 are greatly enlarged planar views of portions of the surface of two other forms of substrate usable in the present invention.

The pattern of bonding material applied to the web can be in any form which leaves a substantial portion of the surface of the web free from bonding material. For example, the bonding material may be applied in a discontinuous predetermined intermittent pattern of discrete solid areas, as shown in FIG. 3. Most preferably the pattern comprises less than 35% of the total surface area of the web so as to leave 65% or more of the surface of the web free from bonding material, at least when print bonded. In FIG. 3, bonded areas are represented by numeral 12. The lighter surrounding areas 14 are unbonded.

Figure 2:
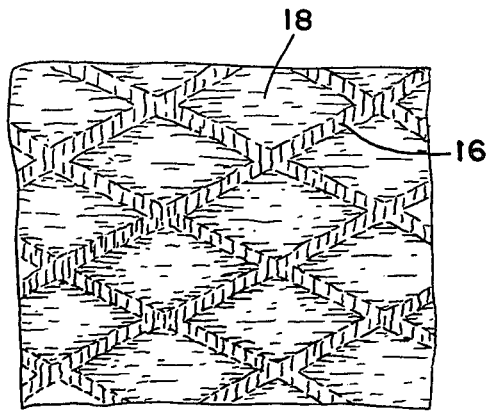
FIG. 2 is a greatly enlarged planar view of a portion of the surface of one form of substrate usable in the present invention.
Figure 4:
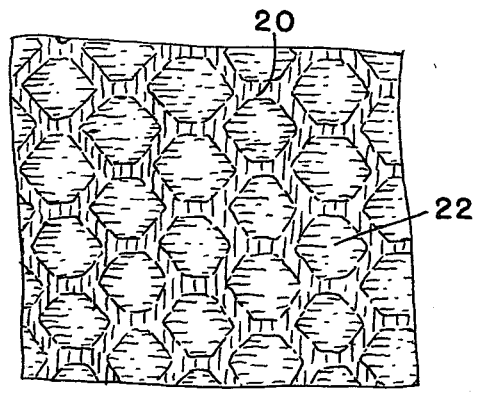

A variety of other patterns could be used. FIG. 2 illustrates a crisscross pattern, having bonded areas 16 and unbonded areas 18. FIG. 4 illustrates a honeycomb pattern having bonded areas 20 and unbonded areas 22.

Application and post-application migration of bonding material must leave areas comprising a substantial portion of the web free from any bonding material, for purposes which will become apparent subsequently.

It has been found to be particularly desirable to apply the bonding material in a continuous predetermined reticular pattern so that the bonding material forms a net-like web of strength over the web. FIGS. 2 and 4 are examples. It is well-known that papermaking fibers generally have a length less than ¼ inch and normally have a predominant fiber length less than 1/16 inch in length. Therefore, when strength is to be primarily imparted to the sheet by a bonding material, instead of by interfiber bonds of the type conventially utilized in papermaking, it is desirable that there be a continuous interconnection of at least some of the fibers by the bonding material throughout the entire web. If the pattern of bonding material is in the form of parallel lines, bars, or other forms of discrete areas, the web will lack substantial strength unless such discrete areas are spaced apart by distances less than average fiber lengths or, typically, less than 1/16 inch. However, where the pattern of adhesive is reticular or net-like in configuration, the interconnected lines of bonding material application provide a network of strength even where substantial areas, in many cases larger than 1/16 inch in every direction, are defined between the lines of bonding material application as discrete unbonded web portions.

Bonding material may be applied either to one or both of the web surfaces. In some cases, a laminated web, having bonding material applied at the interface (by application to one surface of one of the layers), may be used in this invention. The fine pattern of bonding material becomes, in effect, the bonding material holding the laminated web together.

The bonding material used in preparing the cellulosic substrate used in this invention must be compatible (not soluble in or reactive with) the composition used. Furthermore, the bonding material must be capable of securely bonding the web fibers one to another. Among the bonding materials which are capable of accomplishing both of these functions and which can be successfully used are acrylate latex rubber emulsion, emulsions of resins such as acrylates, vinyl acetates, vinyl chlorides, methacrylates, and co-polymers thereof, and co-polymers of carboxy methyl cellulose or polyacrylamide. In other instances, the bonding material may comprise a mixture of several materials. Bonding materials, of course, must be compatible with the composition used with the substrate. Suitable bonding materials will be known to those skilled in the art.

These substrates will have substantial strength, including excellent wet strength with the impregnants used in this invention, even over long periods of time, such as in storage.

In addition to the laminated materials mentioned above, reinforced-type substrates may be used in this invention. Reinforced substrates suitable for this invention would be obvious to those skilled in the art who are familiar with this invention.

A specific example of a substrate usable in this invention is formed as follows. A web is formed from a fiber furnish consisting of 70% by weight of a bleached softwood pulp, and 30% by weight of a bleached hardwood pulp, using a conventional papermaking machine. The web is wet creped as it comes off a dryer roll of the conventional papermaking equipment, and then dried further until about 92% dry. A bonding material comprising a water solution of (by weight) 5% tapioca dextrin, 3% carboxy ethylene vinyl acetate co-polymer, 1% propylene glycol, 0.1% formalin, and 0.1% fluorescent dye is print applied to one side of the web in the fine pattern shown in FIG. 4. The web is printed in a nip formed by a patterned gravure roll having a diameter of 14 inches and an elastomer roll having a diameter of 14 inches and a ⅝ inch neoprene cover of a hardness of 78 shore "A" durometer. The gravure roll surface has a recticular pattern of interconnected hexagons having two of their sides perpendicular to the machine direction and a pattern repeat length of 0.030 inch. The engraved lines of the pattern comprise approximately 40% of the overall surface area. The pressure in the printing nip is controlled at about 150 psig. Prior to drying of the bonding material the web is applied to the surface of a cast iron creping drum having a Brinell hardness of 277 and a diameter of 5 feet by means of an elastomer roll with an average nip pressure against the creping drum of 137 psig. The creping drum is steam heated to a surface temperature of 220°F, and the drum surface speed is 1500 ft./min. As the web is pressed to the drum, the average dryness is about 75%, and before leaving the creping drum, the web has an average dryness of about 95%. The sheet is creped from the surface of the creping drum, to which it has adhered, by a conventional creping doctor blade set at a creping shelf angle of 11° below the radial line at the point of contact.

The compositions used in the impregnated wipers of this invention are oil-in-water emulsions having an internal phase consisting essentially of mineral oil and silicone fluid. In general, the internal phase of the emulsion will be about 4–70% by weight of the composition. Preferably the internal phase is about 10–30% by weight of the composition and the most preferred range is about 18–24%. The internal phase consists essentially of mineral oil, in an amount of about 4–65% by weight of the composition, and silicone fluid, in a weight ratio to mineral oil within the range of about 1:12–2.5:1. The amount of mineral oil is preferably about 8–25% by weight of the composition and most preferably about 15–20%. The silicone fluid is preferably in weight ratio to mineral oil within the range of about 1:6–1:1. Other constituents may be used in the internal phase in amounts which do not interfere with the film forming properties of the mineral oil and silicone fluid. For example, oils such as almond oil, wood oils, and vegetable oils may be used in amounts up to about 5% by weight of the composition provided that this does not exceed about 20% by weight of the internal phase of the emulsion. Minor amounts of fragrances may also be used. In some cases, solvents or waxes may be used in limited amounts, as will be discussed later herein.

The mineral oil usable in this invention should have a viscosity within the range of about 50–250 SSU. Higher or lower viscosity mineral oils may be used as constituents of the mineral oil of any embodiment; the viscosity of the mineral oil blend used must be within the specified range. Napthenic and/or paraffinic mineral oils may be used. Examples of specific mineral oils usable in this invention are Marcol 70 (Exxon Corporation), Marcol 100, Marcol 52 and Primol 205 (Exxon Corporation). Blends of commercially available mineral oils are also useful in this invention. Heavier mineral oils such as Primol 325 and Primol 355 may be blended with less viscous mineral oils to provide useful mineral oil blends.

The silicone fluids which may be employed in the composition of this invention are the organic polysiloxanes, including polydialkyl siloxanes and polyalkyl aryl siloxanes. Polysiloxanes such as dimethyl polysiloxane, diethyl polysiloxane, methyl ethyl polysiloxane, methyl phenyl polysiloxane and copolymers of two or more such siloxanes are exemplary of the silicone fluids which may be used. Dimethyl polysiloxane is especially preferred. The silicone fluids used in this invention have viscosities within the range of about 50–5,000 centistokes, with viscosities on the order of 100–1,000 centistokes being preferred.

Anionic, cationic and nonionic emulsifiers can be successfully utilized in the composition of this invention. The only requirements are that the emulsifier be compatible with the other components and that it produce an oil-in-water emulsion. As is well known, certain emulsifiers will produce water-in-oil emulsions in one environment and oil-in-water emulsions in another. The applicability of a specific emulsifier may, however, be readily tested in accordance with known procedures. For example, the presence or absence of an oil-in-water emulsion can be determined by testing the capacity of the composition to conduct a current. Oil-in-water emulsions conduct electricity, as is well known, while water-in-oil emulsions do not. Some emulsifiers which have been found suitable for the composition of this invention are sorbitan monooleate (Span 80, ICI America), polyoxyethylated sorbitan monooleate (Tween 80, ICI America), Armeen C (a monoamine from Armak Company), di-coco dimethyl ammonium chloride (Arquad 2C-75, Armak Company), and morpholine oleate.

The compositions of this invention are preferably substantially solvent-free and wax-free. Solvents would tend to dry out impregnated wipers and waxes have a tendency to clog the interstices of the substrate of the impregnated wipers and so may interfere with the metering of the impregnant onto the surface being polished and the film deposition properties of the invention. Solvents, however, may be used to improve cleaning characteristics, in any amount which would not interfere with film deposition. Waxes which generally remain in solution with the composition may be used in small amounts (up to about 1%). One example is Hoechst V wax.

Minor amounts of other elements may be used to enhance the characteristics and qualities of the composition and impregnated wiper. For example, minor amounts of formaldehyde may be useful as a bactericide. BTC 2125M from Onyx Chemical Company may be used in minor amounts as a mold inhibitor and fungicide. Very minor amounts of triethanolamine may be used to stabilize the pH. Other preservatives, stabilizers and fragrances may be used.

The composition may be blended generally without particular attention to technique. The blending procedure may be carried out at room temperature in any of a wide variety of blending apparatus. The constituents of the composition may be added in any order. Methods of blending will be apparent to those skilled in the art who are made aware of this invention.

The composition may be loaded, that is, impregnated into the substrate, by a number of techniques presently known. One loading technique is spraying of the composition onto the substrate either before or after it is cut to size. Another technique is a bath process in which the substrate is immersed in a reservoir of composition, either in individual pieces or in a continuous web. Another loading technique is the pouch filling technique. To load in this manner, a piece of substrate is cut to size and folded and inserted in a pouch such as a foil pouch. Thereafter, a measured amount of composition is poured or injected into the pouch. Various other methods of impregnation may be used and many such methods are well-known to those skilled in the art.

In each case, the composition is absorbed by the substrate. The substrate takes up composition in the interstices between fibers and the fibers themselves absorb a certain amount of composition.

The composition is loaded into the substrate in a weight ratio to substrate of about 1:1–3:1. The loading ratio range is preferably about 1.5:1–2.5:1 and is most preferably about 1.8:1–2.3:1, to give the best performance.

It is essential that the substrate be loaded to the proper amount to give the excellent metering properties previously described. The substrate should be loaded to no more than about 50% of its liquid capacity since amounts significantly in excess of 50% would tend to give bleed-out and make the application uneven throughout the application process. It is highly preferred that the substrate be loaded with composition within the range of about 25–40% of its liquid capacity, to give the best metering effect.

EXAMPLES

In the following examples a substrate is prepared by cutting a high loft non-woven cellulosic fibrous web of the type described to the desired size and impregnating it by one of several methods with a composition of the type previously described. The substrates used in each of the examples are products of Scott Paper Company, Philadelphia, Pa. All of these substrates have a liquid capacity of about 600% by weight. The compositions for each example are set forth below. In each case the resulting composition is an oil-in-water emulsion.

EXAMPLE I

| | % by weight of composition |
|---|---|
| Mineral oil (Marcol 70, Exxon Corporation) | 16.00 |
| Dimethyl polysiloxane (500 centistokes) | 5.00 |
| Sorbitan monooleate (Span 80, ICI America) | 1.20 |
| Water | 76.90 |
| Formaldehyde | 0.25 |
| BTC 2125M (Onyx Chemical Company) | 0.50 |
| Fragrance | 0.10 |
| Triethanolamine | 0.05 |

A high loft cellulosic substrate known as the Scott paper Company High Loft Brand 3055-J substrate, which has a liquid capacity of about 600% by weight of substrate and a basis weight of about 93 g./m.$^2$, is loaded to about 225% of substrate weight with the above oil-in-water emulsion by a spraying process. The resulting impregnated wiper exhibits excellent application properties on furniture surfaces including evenness of applied film and duration of effectiveness of the wiper.

EXAMPLE II

The composition of Example I is duplicated except that (1) a lighter mineral oil is used, namely Marcol 52 available from Exxon Corporation, and (2) the silicone fluid used is a methylethyl polysiloxane (DC 550, from Dow-Corning). This composition is impregnated by a bath saturation process into a substrate similar to the substrate Example I except that the basis weight is about 40 g./m.². The impregnant is used in a weight ratio of 2:1 with respect to weight of the substrate. The metering and use life qualities of this wiper are excellent.

EXAMPLE III

The composition of Example I is duplicated except that a heavier mineral oil, Marcol 100 (Exxon Corporation), is used. A substrate of the same type and weight as in Example I is folded and deposited into a foil pouch. Thereafter the composition, in an amount equal to 180% of the weight of the substrate, is deposited within the pouch which is then sealed, allowing the composition to be impregnated into the substrate.

EXAMPLE IV

The composition of Example I is duplicated except that Primol 205 (Exxon Corporation) is used as the mineral oil. A paper similar to that of Example I, but having a basis weight of 80 g./m.², is impregnated by passing such paper over an intaglio roller containing said composition on its surface. By this method the substrate is impregnated with composition in a weight ratio of substrate of 3:1.

EXAMPLE V

| | % by weight of composition |
|---|---|
| Mineral oil (Marcol 70, Exxon Corporation) | 15.00 |
| Dimethyl polysiloxane (500 centistokes) | 3.00 |
| Sorbitan monooleate | 1.20 |
| Water | 79.90 |
| Formaldehyde | 0.25 |
| BTC 2125M (Onyx Chemical Company) | 0.50 |
| Fragrance | 0.10 |
| Triethanolamine | 0.05 |

The above composition is loaded by a bath process into a substrate similar to that of Example I in a weight ratio to substrate of 2.3:1.

EXAMPLE VI

| | % by weight of composition |
|---|---|
| Mineral oil (Marcol 70, Exxon Corporation) | 20.00 |
| Ethyl methyl polysiloxane (500 centistokes) | 4.00 |
| Sorbitan monooleate | 1.20 |
| Water | 73.80 |
| Formaldehyde | 0.25 |
| BTC 2125M (Onyx Chemical Company) | 0.50 |
| Fragrance | 0.10 |
| Triethanolamine | 0.05 |
| Hoechst Wax V | 0.10 |

The above composition is impregnated by a bath process into a two-layer laminated material having separate layers similar to the substrate of Example I and held together by an adhesive which is compatible (is not soluble in or reactive with) the composition, in a weight ratio to substrate of 1.5:1.

EXAMPLE VII

| | % by weight of composition |
|---|---|
| Mineral oil (Marcol 70, Exxon Corporation) | 64.65 |
| Dimethyl polysiloxane (50 centistokes) (General Electric SF-96 (50)) | 5.35 |
| Sorbitan Monooleate | 1.20 |
| Water | 27.90 |
| Formaldehyde | 0.25 |
| BTC 2125M (Onyx Chemical Company) | 0.50 |
| Fragrance | 0.10 |
| Triethanolamine | 0.05 |

The above composition is applied by a bath process to a substrate similar to that in Example I, in a weight ratio of composition to substrate of 2.5:1.

EXAMPLE VIII

| | % by weight of composition |
|---|---|
| Mineral oil (Marcol 70, Exxon Corporation) | 4.00 |
| Dimethyl polysiloxane (5,000 centistokes) (General Electric SF-96 (5,000)) | 0.30 |
| Sorbitan monooleate | 0.80 |
| Water | 94.00 |
| Formaldehyde | 0.25 |
| BTC 2125M (Onyx Chemical Company) | 0.50 |
| Fragrance | 0.10 |
| Triethanolamine | 0.05 |

The above composition is impregnated by a bath process into the same substrate material as in Example I in an amount equal to 210% by weight of the substrate.

EXAMPLE IX

| | % by weight of composition |
|---|---|
| Mineral Oil (Marcol 70, Exxon Corporation) | 16.00 |
| Dimethyl polysiloxane (500 centistokes) (General Electric SF-96 (500)) | 40.00 |
| Armeen C (a monoamine from Armak Company) | 1.00 |
| Polyoxyethylated sorbitan monooleate (Tween 80, ICI America) | 0.20 |
| Water | 41.90 |
| Formaldehyde | 0.25 |
| BTC 2125M (Onyx Chemical Company) | 0.50 |
| Fragrance | 0.10 |
| Triethanolamine | 0.05 |

The above composition is impregnated by a bath process into the substrate of Example I in an amount equal to 210% by weight of the substrate.

EXAMPLE X

| | % by weight of composition |
|---|---|
| Mineral oil (Primol 355, Exxon Corporation) | 5.00 |
| Dimethyl polysiloxane (500 centistokes) | 5.00 |
| Di-coco dimethyl ammonium chloride (Arquad 2C-75, Armak Company) | 0.50 |
| Polyoxyethylated sorbitan monooleate (Tween 80) | 1.00 |
| Water | 88.10 |
| Formaldehyde | 0.25 |
| Fragrance | 0.10 |
| Triethanolamine | 0.05 |

The above composition is impregnated by a bath process into the substrate of Example I, in an amount equal to 210% by weight of the substrate.

EXAMPLE XI

| | % by weight of composition |
|---|---|
| Mineral oil (Marcol 70, Exxon Corporation) | 25.70 |
| Dimethyl polysiloxane (500 centistokes) | 4.30 |
| Morpholine oleate | 1.20 |
| Water | 48.45 |
| Isoparaffinic hydrocarbon (Isopar C, a solvent from Exxon Corporation) | 20.00 |
| Formaldehyde | 0.25 |
| Fragrance | 0.10 |

The above composition is impregnated by a bath process into the same substrate as in Example I, in an amount equal to 210% by weight of the substrate. Greater amounts of solvent would tend to significantly interfere with the film deposition properties of the impregnated wiper.

EXAMPLE XII

| | % by weight of composition |
|---|---|
| Mineral oil (Marcol 70, Exxon Corporation) | 8.00 |
| Dimethyl polysiloxane (500 Centistokes) | 5.00 |
| Sorbitan monooleate | 1.00 |
| Water | 85.10 |
| Formaldehyde | 0.25 |
| BTC 2125M (Onyx Chemical Company) | 0.50 |
| Fragrance | 0.10 |
| Triethanolamine | 0.05 |

The above composition is impregnated into the substrate of Example I in an amount equal to 240% by weight of substrate. This amount of impregnant represents approximately 40% of the liquid capacity of the substrate. The metering of composition during use of this wiper of this example is excellent.

EXAMPLE XIII

| | % by weight of composition |
|---|---|
| Mineral oil (Marcol 70, Exxon Corporation) | 25.70 |
| Dimethyl polysiloxane (500 centistokes) | 4.30 |
| Sorbitan monooleate | 1.20 |
| Water | 67.90 |
| Formaldehyde | 0.25 |
| BTC 2125M (Onyx Chemical Company) | 0.50 |
| Fragrance | 0.10 |
| Triethanolamine | 0.05 |

The above composition is impregnated by a bath process into a substrate similar to the substrate of Example I, in a weight ratio to substrate of 1.5:1. This represents approximately 25% of the liquid capacity of the substrate. The resultant wipe exhibits good metering properties.

While in the foregoing specification this invention has been described in relation to preferred embodiments and many details have been set forth for purpose of illustration it will be apparent to those skilled in the art that the invention is susceptible to additional embodiments and that certain of the details described herein can be varied considerably without departing from the basic principles of the invention.

I claim:

1. A disposable self-polishing wiper for polishing of household surfaces with an emulsion polish, depositing a glossy protective film thereon, comprising:

a cellulosic fibrous web substrate having a basis weight of at least about 40 g./m.$^2$, said substrate having a bonding material penetrated into at least one surface thereof in a fine pattern to form bonded web portions of greater strength than adjacent portions not containing said bonding material, said substrate being substantially compressible, said substrate having a liquid capacity of at least about 200% by weight of substrate; and a surface treating liquid composition impregnated in said substrate in a weight ratio range to said substrate of about 1:1 – 3:1, said composition being a substantially wax-free oil-in-water emulsion comprising water and an internal phase consisting essentially of about 4 – 65% by weight of a mineral oil having a viscosity of about 50–250 SSU, silicone fluid in a weight ratio to said mineral oil of about 1:12 – 2.5:1 and having a viscosity of about 50 – 5,000 centistokes, said emulsion having an internal phase of about 4 – 70% by weight of said composition, said substrate being loaded to no more than about 50% of liquid capacity.

2. The wiper of claim 1 wherein said substrate has a basis weight of at least about 80 g./m.$^2$.

3. The wiper of claim 1 wherein said composition is about 8 – 25% by weight mineral oil and said internal phase is about 10 – 30% of the weight of said composition.

4. The wiper of claim 3 wherein said composition is about 15 – 20% by weight mineral oil and said internal phase is about 18 – 24%, of the weight of said composition.

5. The wiper of claim 1 wherein the weight ratio of silicone fluid to mineral oil is in the range of about 1:6 – 1:1.

6. The wiper of claim 1 wherein the weight ratio of composition to substrate is within the range of about 1.5:1 – 2.5:1.

7. The wiper of claim 6 wherein the weight ratio of composition to substrate is within the range of about 1.8:1 – 2.3:1.

8. The wiper of claim 1 wherein said substrate is loaded with said composition within the range of about 25 – 40% of its liquid capacity.

9. The wiper of claim 1 wherein the substrate is creped after said bonding material is applied.

10. The wiper of claim 9 wherein said composition is about 8 – 25% by weight mineral oil and said internal phase is about 10 – 30%, of the weight of said composition.

11. The wiper of claim 10 wherein the weight ratio of silicone fluid to mineral oil is in the range of about 1:6 – 1:1.

12. The wiper of claim 11 wherein the weight ratio of composition to substrate is within the range of about 1.5:1 – 2.5:1.

13. The wiper of claim 12 wherein the weight ratio of composition to substrate is within the range of about 1.8:1 – 2.3:1.

14. The wiper of claim 13 wherein said substrate is loaded with said composition within the range of about 25 – 40% of its liquid capacity.

15. The wiper of claim 14 wherein said substrate has a basis weight of at least about 80 g./m.$^2$.

16. The wiper of claim 10 wherein said composition is about 15 – 20% by weight mineral oil and said internal phase is about 18 – 24% of the weight of said composition.

17. The wiper of claim 16 wherein the weight ratio of silicone fluid to mineral oil is in the range of about 1:6 – 1:1.

18. The wiper of claim 17 wherein the weight ratio of composition to substrate is within the range of about 1.5:1 – 2.5:1.

19. The wiper of claim 18 wherein the weight ratio of composition to substrate is within the range of about 1.8:1 – 2.3:1.

20. The wiper of claim 19 wherein said substrate is loaded with said composition within the range of about 25 – 40% of its liquid capacity.

21. The wiper of claim 20 wherein said substrate has a basis weight of at least about 80 g./m.$^2$.

* * * * *

UNITED STATES PATENT OFFICE
CERTIFICATE OF CORRECTION

Patent No. 3,965,518　　　　　　　　　　Dated　June 29, 1976

Inventor(s)　　Erland L. Muoio

It is certified that error appears in the above-identified patent and that said Letters Patent are hereby corrected as shown below:

Column 1, line 40, "substates" should be --substrates--.

Column 8, line 4, "shore" should be capitalized.

Column 10, line 51, "paper" should be capitalized.

Claim 4, line 3, the comma after "24%" should be deleted.

Claim 10, line 3, the comma after "30%" should be deleted.

Signed and Sealed this

Twelfth Day of October 1976

[SEAL]

*Attest:*

RUTH C. MASON
*Attesting Officer*

C. MARSHALL DANN
*Commissioner of Patents and Trademarks*